United States Patent [19]

Thorby et al.

[11] 4,441,671
[45] Apr. 10, 1984

[54] TAKE-OFF RAMPS FOR AIRCRAFT

[75] Inventors: Douglas C. Thorby, Shepperton; Michael C. W. Sullivan, Sutton, both of England

[73] Assignee: British Aerospace Public Limited Company, London, England

[21] Appl. No.: 442,298

[22] Filed: Nov. 17, 1982

Related U.S. Application Data

[63] Continuation of Ser. No. 188,667, Sep. 19, 1980, abandoned.

[30] Foreign Application Priority Data

Sep. 29, 1979 [GB] United Kingdom ................. 7933885

[51] Int. Cl.³ .............................................. B64F 1/04
[52] U.S. Cl. .................................. 244/63; 244/114 R
[58] Field of Search ............... 244/63, 104 R, 104 FP, 244/114 R, 116

[56] References Cited

U.S. PATENT DOCUMENTS 4,173,323 11/1979 Thorby et al. ........................ 244/63

OTHER PUBLICATIONS

"Ski Jump Harrier", Flight International, Dec. 4, 1976, pp. 1630-1635.

Primary Examiner—Trygve M. Blix
Assistant Examiner—Rodney Corl
Attorney, Agent, or Firm—Cushman, Darby & Cushman

[57] ABSTRACT

An aircraft take-off ramp, for causing an aircraft with a compressible, shock absorbing and damping landing gear to be so urged from a horizontal path that it follows an initially ballistic trajectory on leaving the ramp, has its profile derived from a notional generally circular arc. The notional arc has its radius selected so that the center of gravity of the aircraft, if its landing gear was incompressible, would follow a desired locus. The derived profile is so modified from the notional arc that during traverse of the ramp the compressible landing gear is compressed so that the center of gravity of the aircraft follows the desired locus.

1 Claim, 9 Drawing Figures

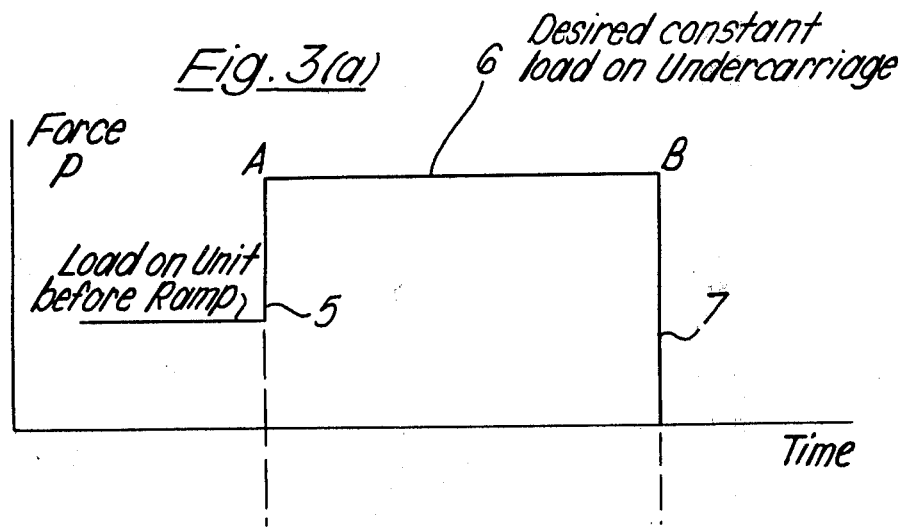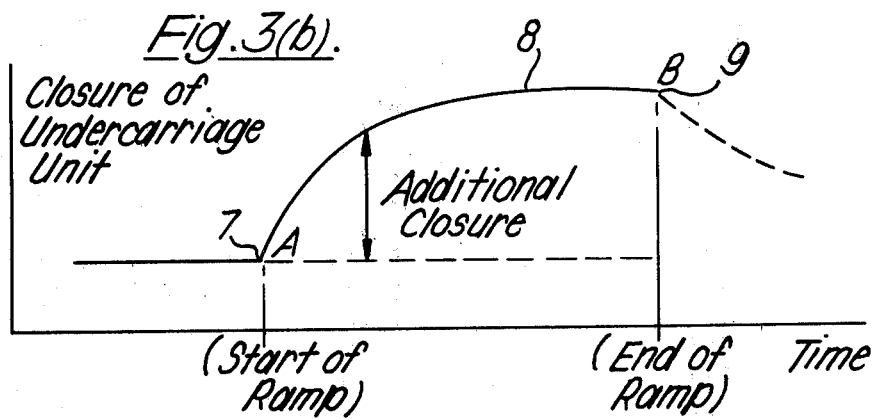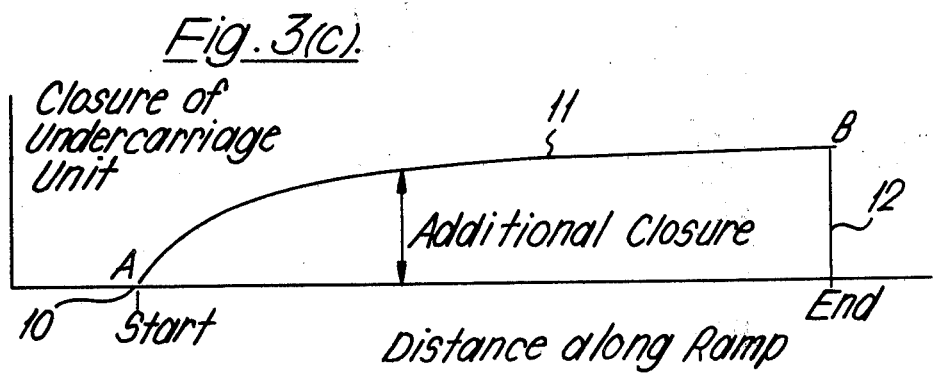

TAKE-OFF RAMPS FOR AIRCRAFT

This is a continuation of application Ser. No. 188,667 (now abandoned), filed Sept. 19, 1980.

This invention relates to ramps along which an aircraft travels during take-off to achieve an initially ballistic trajectory on leaving the ramp during which the change to wing borne flight can be made.

Such ramps have particular but not totally exclusive utility when used by aircraft having the ability to deflect their propulsive thrust downward or partly downward; in this case the period of ballistic trajectory is extended by such thrust deflection yielding a relatively long period in which the aircraft can be accelerated to wing borne flight speed. Such ramps enable an aircraft using them to carry additional payload or, alternatively, the take-off distance can be reduced for the same payload.

From purely static considerations, it is found that the ideal profile, that is to say the shape of a take-off surface of the ramp when viewed from the side, is a circular arc. However, ramps having a purely circular arc form in profile are found to cause an aircraft having a compressible landing gear (which inherently constitutes an oscillatory system) to undesirably oscillate in pitch and heave after initial engagement of a ramp. This oscillation is due to the rapid application of centrifugal force. The term "compressible" in this application denotes any landing gear having not only shock absorbers and dampers but also tyred wheels, which also have some compliancy. The term is used in contrast to a notional rigid, incompressible landing gear.

Present ramps, accordingly, have been provided with a transition region for engagement by a landing gear before engagement of the ramp proper so that the centrifugal force was applied relatively gradually. Such a transition region, however, tended to excessively increase the size of the ramp.

It is an object of the present invention to provide an aircraft take-off ramp in which ramp induced oscillations of an aircraft with a compressible landing gear are at least reduced and in which the size of the ramp is not excessively increased beyond that associated with a generally circular arc profile.

According to the present invention an aircraft take-off ramp, adapted to be associated with a generally horizontal take-off surface and for use by an aircraft having a compressible landing gear, such that an aircraft during take-off is so urged from the take-off surface that it follows an initially ballistic trajectory on leaving the ramp, the ramp having a profile so modified from a notional generally circular arc of radius such that the centre of gravity of the aircraft, if its landing gear was incompressible, would follow a desired locus yielding a high, generally constant acceleration, that during traverse of the ramp the compressible landing gear is compressed whereby the centre of gravity of the aircraft follows said desired locus.

The theoretical development of an aircraft take-off ramp is described with reference to the accompanying drawings in which FIGS. 1-4 illustrate a simplified theory and FIGS. 5-8 illustrate a more comprehensive theory.

In the drawings:

FIG. 3a is a graph of load exerted on a landing gear plotted against time,

FIG. 3b is a graph of compression of that landing gear plotted against time,

FIG. 3c is a graph of compression plotted against distance along a ramp,

Figure 4:
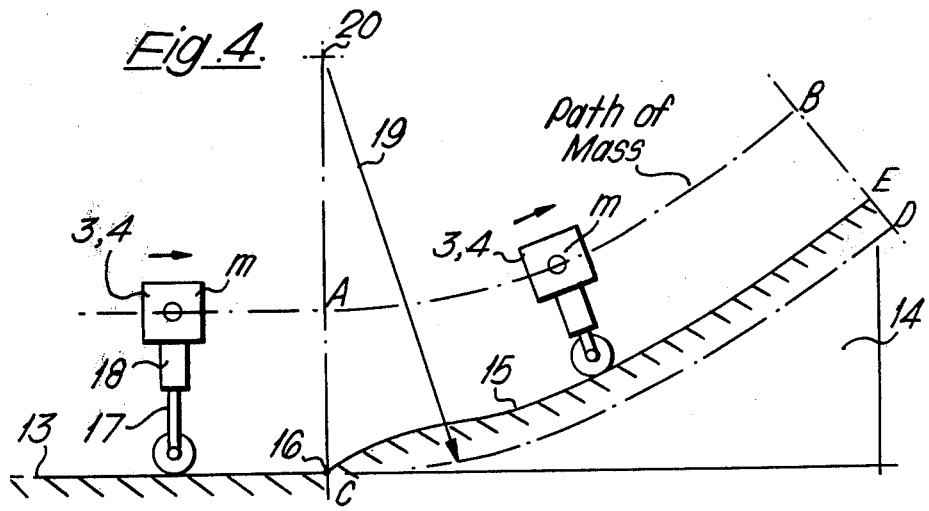
Figure 5:
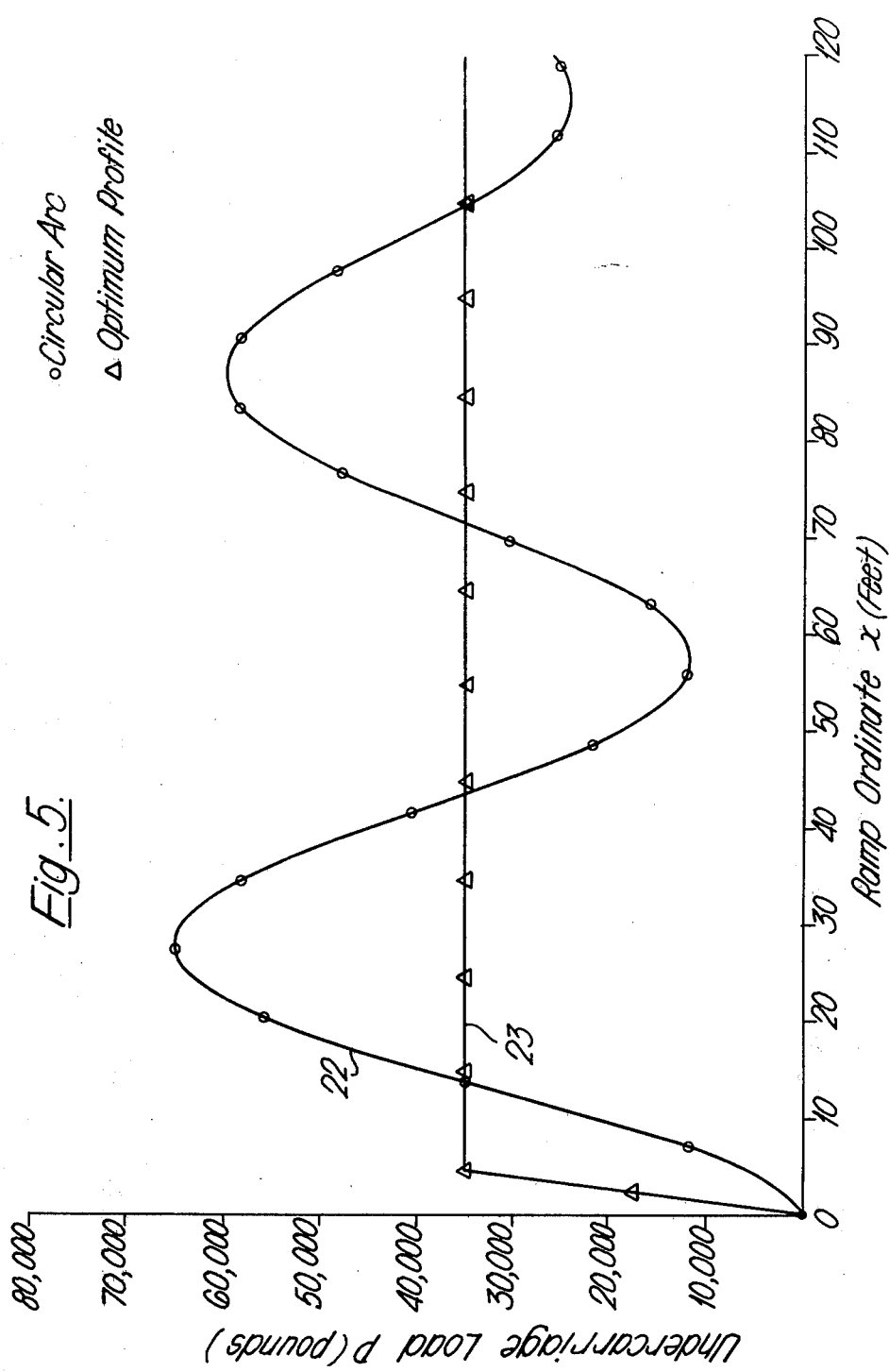
Figure 6:
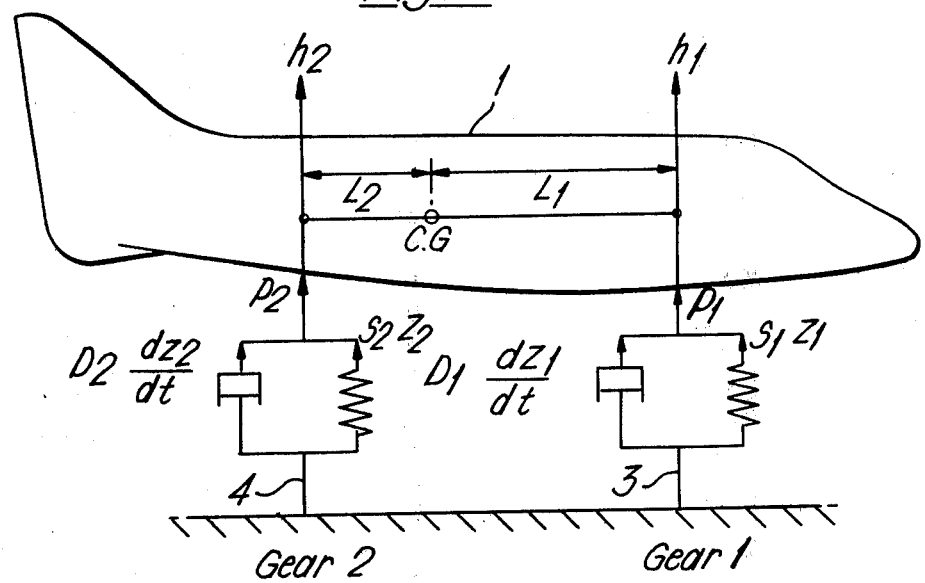
Figure 7:
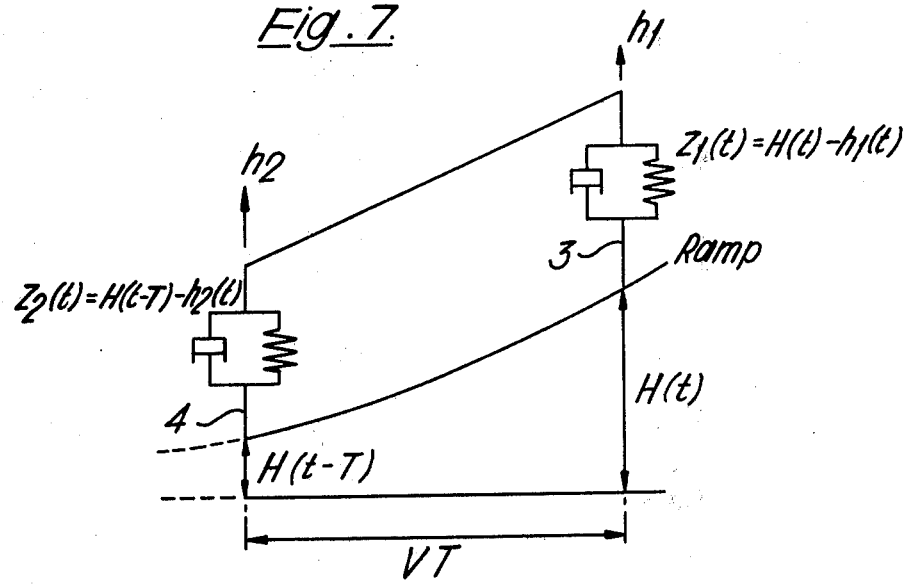

FIG. 4 is a diagrammatic side view of an aircraft take-off ramp according to the invention, FIG. 5 is a graph of landing gear load, that is to say the compressive load on the gear effected by ramp profile plotted against ramp horizontal length, FIG. 6 is a diagram of an aircraft which may use the ramp, the aircraft being shown in static equilibrium and, FIG. 7 is a similar diagram illustrating the aircraft travelling along the ramp.

Referring initially to FIGS. 1-4, the theory is illustrated with reference to an aircraft 1 which has a centre of gravity 2, a forward compressible landing gear unit 3 situated at a distance a from the centre of gravity 2, and a rearward compressible landing gear unit 4 situated at a distance b from the centre of gravity 2.

Figure 1:
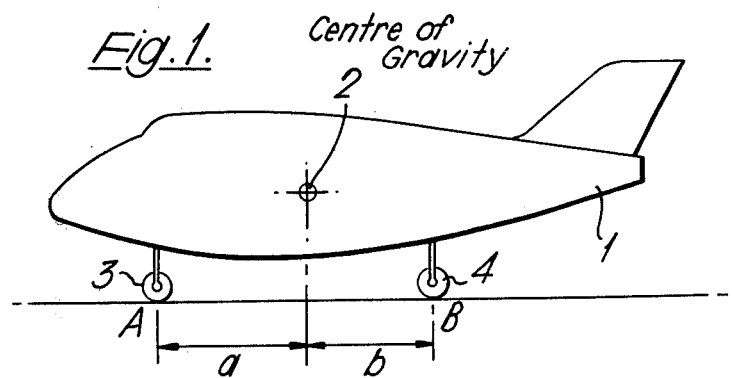
FIG. 1 is a side view of an aircraft.
Figure 2:
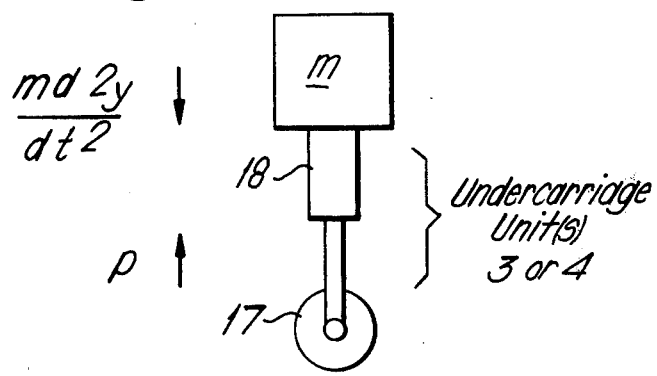
FIG. 2 is a diagrammatic view of a compressible landing gear.

It is possible to apportion the total mass of an aircraft between say the forward landing gear unit 3 and the rearward landing gear unit 4 (bearing in mind that the landing gears 3 and 4 can be groups of landing gears providing each gear of the group is in register with the others of the group when viewed from the side as shown in FIG. 1) so that each landing gear unit is associated with a particular mass. Although this apportionment can be arbitrary without invalidating the theory, it can be exact if the expression $ab = K^2$ where a is the distance of the gear unit 3 from the centre of gravity 2, b is the distance of the gear unit 4 from the centre of gravity 2, K is the radius of gyration of the aircraft in pitch, and, $K^2 = I/M$ where I=pitch inertia of aircraft, and, M=total mass of aircraft.

Continuing this simple approach, the force P on a single landing gear unit 3 or 4 (as shown with reference to FIG. 2) is equal and opposite to the inertia force, that is to say $$\frac{md^2y}{dt^2} = P$$

where m is that mass apportioned to the particular gear unit, y is the vertical displacement of the aircraft, and, t is the time interval.

Referring now to FIG. 3a, for maximum take-off enhancement, the upward velocity component V imparted to the aircraft must be a maximum, which implies that the upward momentum mv where m is the mass associated with a particular landing gear unit, must also be a maximum.

Upward momentum is essentially the time integral of the upward force P provided by the landing gear. This must not exceed some predetermined value—normally that value which would cause a compressible, that is to say for example a telescopic landing gear leg and tyred wheel to become fully compressed. It follows that the most efficient ramp take-off is obtained when the landing gear force is held constant at the maximum value for the duration of the time the aircraft spends on the ramp. This is to say that the landing gear is effectively compressed to the point of rigidity. As plotted in FIG. 3a (upward force P against time) this most efficient ramp take-off is shown at reference 5 which is the start or entry to the ramp and indicates an instantaneous force build-up on the landing gear and a maintained maximum constant force P, referenced 6, until the ramp exit 7 is reached.

Since the inertia force $$\frac{md^2y}{dt^2}$$

applied by the mass to the landing gear is equal to but opposite in direction to the landing gear force P this also must be constant. The acceleration of the mass m must therefore be constant and the path, that is to say the locus, of the mass m is therefore known—it is a circular arc. This is illustrated in FIG. 4 at A, B.

To continue, noting that the landing gear force must be at a constant maximum whilst the aircraft is upon the ramp for a maximum efficiency take-off, as shown at 5, 6 and 7 in FIG. 3a, some way effecting this constant maximum is desirably provided. Referring now to FIG. 3b, which for present purposes assumes that at ramp engagement there is no static compression of the landing gear, this constant maximum landing gear force can be achieved by causing the compressible landing gear to become compressed to its fullest extent at a rate depending upon the shock absorbing and damping characteristics of the landing gear itself, that is to say the variation of compression with time. These characteristics are conveniently termed the "closure time history." Thus the desired effect can be achieved by causing the closure time history of the landing gear unit on engagement of the ramp to be that history which gives constant load. This may be determined in two ways:

1. By applying the required force to the actual landing gear unit and measuring the compression as a function of time, and/or
2. by computation.

One way of doing this computation is discussed with reference to FIGS. 5–8 below.

In either case, the graph of FIG. 3b is obtained. In this figure, which is a graph of landing gear compression plotted against time, reference 7 is the start of the ramp, and reference 8 is the curve indicating the landing gear compression necessary to effect maximum force during engagement with ramp, reference 9 indicating the exit of the ramp. The compression of FIG. 3b is then conveniently replotted against distance travelled along the ramp by the landing gear unit to become one component of the profile of a ramp according to the invention. This is illustrated in FIG. 3c where reference 10 is the start of the ramp, reference 11 is the curve of gear compression plotted against distance, and reference 12 is the ramp exit.

To achieve simultaneously both the desired inertia force and a *balancing* landing gear force in one ramp profile, it is evident that the profile component obtained from the closure history of the landing gear (FIGS. 3b and 3c) must be superimposed upon that component required to give the mass (or rather its centre of gravity) locus, (FIGS. 2 and 3a) if the landing gear were rigid, that is to say the circular arc form discussed above.

FIG. 4 illustrates the two profile components superimposed one upon the other. A generally horizontal take-off surface 13 lies in tandem with an aircraft take-off ramp shown generally at 14. The ramp has a take-off surface 15 including an entry edge 16. An aircraft landing gear unit 3 or 4 having an associated mass m, a tyred wheel 17, and a telescopic shock-absorbing and damping leg 18 connecting the wheel with the mass is also illustrated. The take-off surface of the ramp has its profile when viewed from the side formed from the two profile components to which reference has been made above. The first is that which provides the mass m with the locus A, B and is a circular arc C, D shown in broken outline having a radius 19 whose origin 20 is positioned such that the circular arc C, D has its point C at a position of tangency with the horizontal take-off surface 13, the point of tangency C being coincident with the entry edge 16, that is to say vertically below the origin 20, when viewed from the side. For case of incorporation in FIG. 4, origin 20 is shown schematically much closer to take off surface 13 than would be the case in practice; in practice origin 20 would lie at the intersection of lines AC and BD. The second is that which provides the predetermined compression of the landing gear unit 3 or 4 which ensures that the mass m is maintained on its locus A, B. The final corrected profile is C, E being the two coterminous components added together. In effect, the profile C, E is a cam surface of which the thickness increases along its length and the rate of increase of thickness decreases therealong, the cam surface being superimposed on the profile C, D to make the landing gear unit compress such that load transmitted by the gear equals the inertia force on the mass m over the distance C to E. The force and load remain constant, equal and opposite; the landing gear unit compression is therefore non-oscillatory.

In each figure the letters A, B respectively denote the entrance and exit of the ramp.

In FIG. 5 the compressive load effected by an unmodified ramp is shown at 22 whilst the compressive load effected by the ramp of FIG. 4 is shown at 23. As can be seen the unmodified ramp causes an oscillatory load with excessive peaks and troughs whilst the ramp of FIG. 4 causes a steep rise in load within a short distance (say 5 ft.) of ramp engagement by an aircraft wheel. The load rapidly reaches a maximum of constant value and the oscillatory effect is removed.

A detailed method of determining the ramp profile of FIG. 4 whereby the load curve 23 is achieved is now described with reference to FIGS. 6 and 7.

In these figures an aircraft is represented by a body 1 with mass and pitch inertia supported on two landing gear units 3 and 4 similar to those shown in FIG. 4. Basic assumptions are:

That there is vertical equilibrium at the start of a ramp with displacements and loads being defined as increments due to the effect of the ramp.

That changes in aircraft speed, thrust, and aerodynamic loads on the ramp are negligible.

That there is linearity in the sense that (1) equilibrium is satisfied on the undisturbed aircraft and (2) the landing gear units are represented by viscous dampers and linear springs.

These assumptions are not essential, but they considerably simplify the analysis, and lead to an explicit formula for ramp profile according to the invention.

The notation used with reference to the Figures is as follows:

M = Aircraft Mass.
K = Aircraft Pitch Radius of Gyration.
V = Aircraft Speed.
h = Aircraft Vertical Displacement.
S = Landing Gear Stiffness.
D = Landing Gear Damping.
P = Landing Gear Load.
Z = Landing Gear Compression.

H=Ramp Height.

L=Distance of Point of Application of Gear Load from Aircraft Centre of Gravity.

It should be noted the P, h, and Z are incremental changes due to the ramp. Also that for twin landing gear units the leading unit 3 is given the suffix 1, whilst the trailing unit 4 is given the suffix 2.

The Heave and Pitch motions of an aircraft travelling along a ramp can be conveniently defined in terms of the aircraft vertical displacements at the points of application of the loads on the landing gear units 3 and 4.

The equations are:

$$\left\{\frac{K^2}{K^2 + L_1^2}\right\} M \frac{d^2h_1}{dt^2} = P_1 + \left(\frac{K^2 - L_1 L_2}{K^2 + L_1^2}\right) P_2 \quad (a)$$

$$\left\{\frac{K^2}{K^2 + L_2^2}\right\} M \frac{d^2h_2}{dt^2} = P_2 + \left(\frac{K^2 - L_1 L_2}{K^2 + L_2^2}\right) P_1 \quad (b)$$

and the landing gear compressions are given by:

$$D_1 \frac{dZ_1}{dt} + S_1 Z_1 = P_1 \quad (c)$$

$$D_2 \frac{dZ_2}{dt} + S_2 Z_2 = P_2 \quad (d)$$

where t=time elapsed from the leading gear encountering the ramp.

The (incremental) deflections due to the ramp are related to ramp profile by:

$$h_2(t+T)+Z_2(t+T)=h_1(t)+Z_1(t)=H(t) \quad (e)$$

assuming $t \geq 0$, where T is the delay between the landing gear units 3 and 4 encountering the ramp, and the leading gear unit 3 encounters the ramp at t=0.

The ramp ordinate is given by:

$$X=Vt(X \geq 0) \quad (f)$$

where V is aircraft speed assumed constant during traverse of the ramp.

In general it is not possible to control the loads on two landing gear units with a single ramp profile. However, with suitable design features, the two landing gear units can be mathematically reduced to a single landing gear as follows:

If the landing gear units are arranged such that $$L_1 L_2 = K^2 \quad (g)$$

the equations (a) and (b) reduce to those of two independent masses;

$$(G_1 M) \frac{d^2h_1}{dt^2} = D_1 \frac{dZ_1}{dt} + S_1 Z_1 = P_1 \quad (h)$$

$$(G_2 M) \frac{d^2h_2}{dt^2} = D_2 \frac{dZ_2}{dt} + S_2 Z_2 = P_2 \quad (i)$$

where $$G_1 = \frac{L_2}{L_1 + L_2} \text{ and } G_2 = \frac{L_1}{L_2 + L_1}$$

If landing gear elastic constants in the same proportions as the masses are chosen, that is:

$$S_1 = G_1 S \quad D_1 = G_1 D$$

$$S_2 = G_2 S \quad D_2 = G_2 D$$

where S and D are the total stiffness and damping of the landing gear, the equations for each gear unit are essentially the same and the aircraft may be modelled to have the characteristics:

$$M \frac{d^2h}{dt^2} = D \frac{dZ}{dt} + SZ = P(t) \quad (j)$$

$$h(t) + Z(t) = H(t) \quad (k)$$

Individual gear unit loads and displacements are related to (j) and (k) above by:

$$P_1(t)=G_1 P(t), P_2(t+T)=G_2 P(t),$$

$$h_2(t+T)=h_1(t)=h(t), Z_2(t+T)=Z_1(t)=Z(t) \quad (l)$$

and the max total load on the landing gear is given by:

$$[P_1(t) + P_2(t)]_{max} = [G_1 P(t) + G_2 P(t - T)]_{max} \leq [P(t)]_{max} \quad (m)$$

which follows from the definition of $G_1$ and $G_2$.

Note that the mathematical reduction of the twin landing gear units 3 and 4 to a single equivalent landing gear is not in principle restricted to the case of linear gear elasticity.

It has been shown in equations (j) and (k) above that with a suitable choice of landing gear design the equations of motion reduce to:

$$M \frac{d^2h}{dt^2} = D \frac{dZ}{dt} + SZ = P(t), \text{ and}$$

$$h(t) + Z(t) = H(t) \text{ where } t \geq 0.$$

In terms of ramp ordinate X=Vt these reduce to:

$$MV^2 \frac{d^2h}{dX^2} = DV \frac{dZ}{dx} + SZ = P(x) \quad (n)$$

$$h(x) + Z(x) = H(x) \quad X \geq 0. \quad (o)$$

where V is the aircraft speed. Using these equations there is an optimum solution to the problem of ramp profile design which is given below.

For a rigid landing gear the ramp angle $\theta$ (that is to say the angle of the profile to the horizontal at any given point) is given by:

$$\tan \theta = \frac{dH}{dx} = \frac{dh}{dx} = \int_0^x \frac{d^2h}{dx^2} dx = \frac{1}{MV^2} \int_0^x P(x) dx. \quad (p)$$

The optimum choice of (incremental) landing gear load is a step-function, that is to say:

$$P(x) = 0 \; X < 0$$
$$= F \; X > 0$$

where F is the maximum allowable load on the landing gear due to the effects of the ramp. Integration then gives the required profile:

$$H(x) = h(x) = \frac{Fx^2}{2MV^2} \tag{q}$$

This is a parabolic curve being the linearised version of the circular arc curve which would generate a normal force F on a mass M travelling along the ramp at speed V.

In practice, compression of the landing gear is very small when compared with overall ramp dimensions and the step function landing gear load characteristics may be considered optimum as regards ramp length and height required to achieve a specific ramp angle where the aircraft leaves the ramp. A drawback of the step load arises when aircrew tolerance to rate of change of acceleration or "jerk" is considered.

Differentiating the aircraft equation of motion defined at (j) above gives:

$$M \frac{d^3 h}{dt^3} = \frac{dP}{dt} \tag{r}$$

and the "jerk" on the aircrew must be less than same limit J, that is:

$$\frac{d^3 h}{dt^3} \leq J \tag{s}$$

The landing gear load characterisitcs must therefore satisfy:

$$\frac{V dP}{dx} = \frac{dP}{dt} \leq MJ$$

Where in practice we limit "jerk" at the landing gear stations.

This "jerk" limitation is clearly not satisfied by a step load, and the definition of the optimum landing gear load history must be accordingly changed to:

$$P(x) = 0 \; X \leq 0 \tag{u}$$
$$= \frac{MJx}{V} \; 0 \leq X \leq \frac{FV}{MJ}$$
$$= F \; X \geq \frac{FV}{MJ}$$

which satisfies the condition.

Bearing in mind the relatively low acceleration induced by a ramp take-off, the need for a "jerk" limit is somewhat doubtful. However, the form of landing gear load characteristic given at (u) above has an advantage that the resultant ramp profile is continuous in the limit of zero landing gear damping, which is not true for the step load. In practice the linear transition to maximum load could be used to reduce the effect of landing gear damping which is difficult to quantify.

Inserting the optimum landing gear load history defined at (u) above into the equation of motion given at (j) and (k) above the corresponding ramp profile is:

$$H(x) = h(x) + Z(x) X \geq 0$$

where the aircraft vertical displacement h and the landing gear compression Z satisfy the equations:

$$MV^2 \frac{d^2 h}{dx^2} = DV \frac{dz}{dx} + SZ = \frac{MJ}{V} x, \; 0 \leq X \leq \frac{FV}{MJ}$$

$$= F, \; X \geq \frac{FV}{MJ}$$

Defining four characteristic dimensions for the ramp:

$$a = \frac{FV}{MJ} \quad d = \frac{DV}{S}$$

$$r = \frac{Fa^2}{MV^2} \quad f = \frac{F}{S}$$

the optimum ramp profile is given by:

$$h(x) = r \left\{ \frac{1}{6} \left( \frac{x}{a} \right)^3 \right\} \; 0 \leq x \leq a \tag{v}$$

$$r \left\{ \frac{1}{2} \left( \frac{x}{a} \right)^2 - \frac{1}{2} \left( \frac{x}{a} \right) + \frac{1}{6} \right\} \; X \geq a \tag{w}$$

$$z(x) = f \left\{ \left( \frac{x}{a} \right) \times \left( \frac{d}{a} \right) \left[ e^{\frac{-x}{d}} - 1 \right] \right\} \; 0 \leq X \leq a \tag{y}$$

$$= f \left\{ 1 + \left( \frac{d}{a} \right) \left[ e^{\frac{-x}{d}} - e^{\frac{a-x}{d}} \right] \right\} \; X \geq a \tag{z}$$

For the limiting case of a step-function load (a=0) and an undamped landing gear (d=0) the ramp profile is simply:

$$H(x) = \frac{Fx^2}{2MV^2} + \frac{F}{S} \; X > 0$$

which is the basic parabolic ramp profile for a rigid landing gear considered at (q) above with an added constant, namely the landing gear deflection due to the step load. Note that the ramp is discontinuous at the start.

An example based generally upon the British Aerospace Harrier aircraft but with locked landing gear shock absorbers and dampers is given below. In this case landing gear flexibility arises only from the tyres of the fuselage mounted nose and main gears. Any influence of the wing mounted landing gears is ignored.

The relevant aircraft data is:

| | |
|---|---|
| M = 20,000 lbs. | (Aircraft Mass) |
| V = 140 ft./sec. | (Aircraft Speed) |
| S = 140,000 lbs./ft. | (Total landing gear stiffness) |

| | -continued | |
|---|---|---|
| D = 1,000 lbs./ft./sec. | (Total landing gear damping) | |
| F = 35,000 lbs. | Maximum Load (due to ramp) | |
| J = 49 g/sec. | Maximum Jerk (due to ramp) | |
| g = 32.2 ft./sec² | Acceleration due to gravity | | giving the ramp parameters:

$$a = \frac{FV}{MJ} = \frac{35,000 \times 140}{20,000 \times 49} = 5 \text{ ft.}$$

$$r = \frac{Fa^2}{MV^2} = \frac{35,000 \times 32.2 \times 5^2}{20,000 \times 140^2} = .072 \text{ ft.}$$

$$d = \frac{DV}{S} = \frac{1,000 \times 140}{140,000} = 1 \text{ ft.}$$

$$f = \frac{F}{S} = \frac{35,000}{140,000} = .25 \text{ ft.}$$

The optimum ramp profile is then, when substituting in (V) and (y) above:

$$H(x) = .072 \left\{ \frac{1}{6}\left(\frac{x}{5}\right)^3 \right\} +$$

$$.25\left\{ \left(\frac{x}{5}\right) + \left(\frac{1}{5}\right)[e^{-x} - 1] \right\}$$

when $0 \leq X \leq 5$ ft., and when substituting in (w) and (z) above, $$H(x) = .072 \left\{ \frac{1}{2}\left(\frac{x}{5}\right)^2 - \frac{1}{2}\left(\frac{x}{5}\right) + \frac{1}{6} \right\} +$$

$$.25\left\{ 1 \times \left(\frac{1}{5}\right)[e^{-x} - e^{5-x}] \right\}$$

when $X \leq 5$ ft.

These results are plotted in FIG. 4.

The landing gear loads corresponding to the profile of the ramp at the various ordinates along its length are, it will be recalled, given in FIG. 5.

We claim:

1. A take-off ramp for an aircraft having compressible landing gear, said take-off ramp being adapted to be associated with a generally horizontal take-off surface, said ramp having an upper surface profile defined by the superimposition of two coterminous profiles, the first of which being a generally circular arc having an origin positioned such that the arc has a point of tangency with said horizontal take-off surface, the second profile comprising a cam-like surface, the thickness of which increases along its length but the rate of increase of thickness decreasing therealong, the first profile causing a generally constant radial load to be transmitted to the aircraft via said compressible landing gear as it traverses the ramp, the second profile being arranged to compensate for contraction of the landing gear caused by the transmission of said radial load, whereby as the aircraft traverses the ramp it closely follows a generally circular path having an origin substantially coincident with the origin of said first profile, irrespective of the contraction of the landing gear.

* * * * *